July 27, 1954
M. GOLDBERG
2,684,801
FILLING MACHINE
Filed May 27, 1950
3 Sheets-Sheet 3
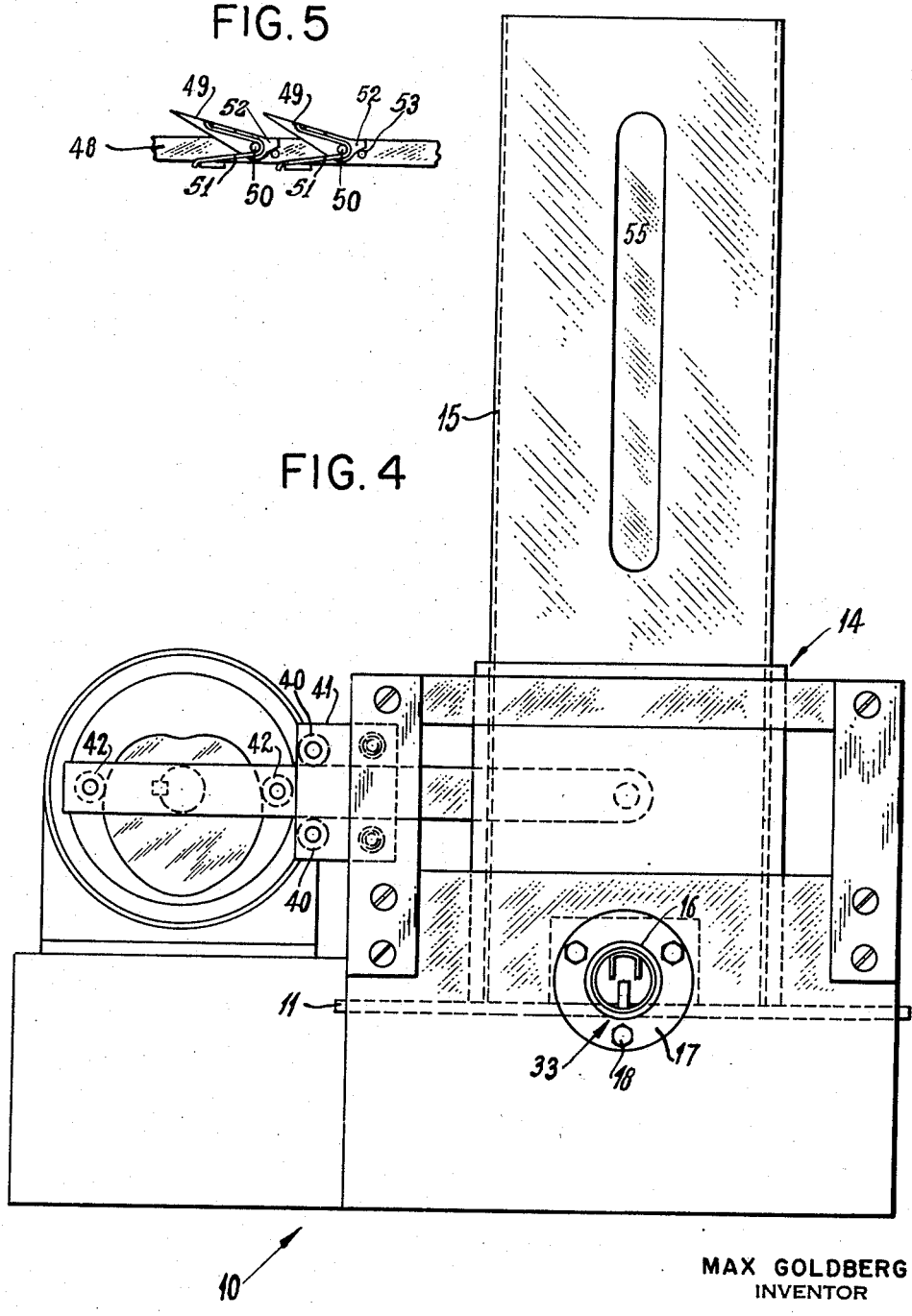
MAX GOLDBERG
INVENTOR
BY *Joseph Blacker*
ATTORNEY Patented July 27, 1954

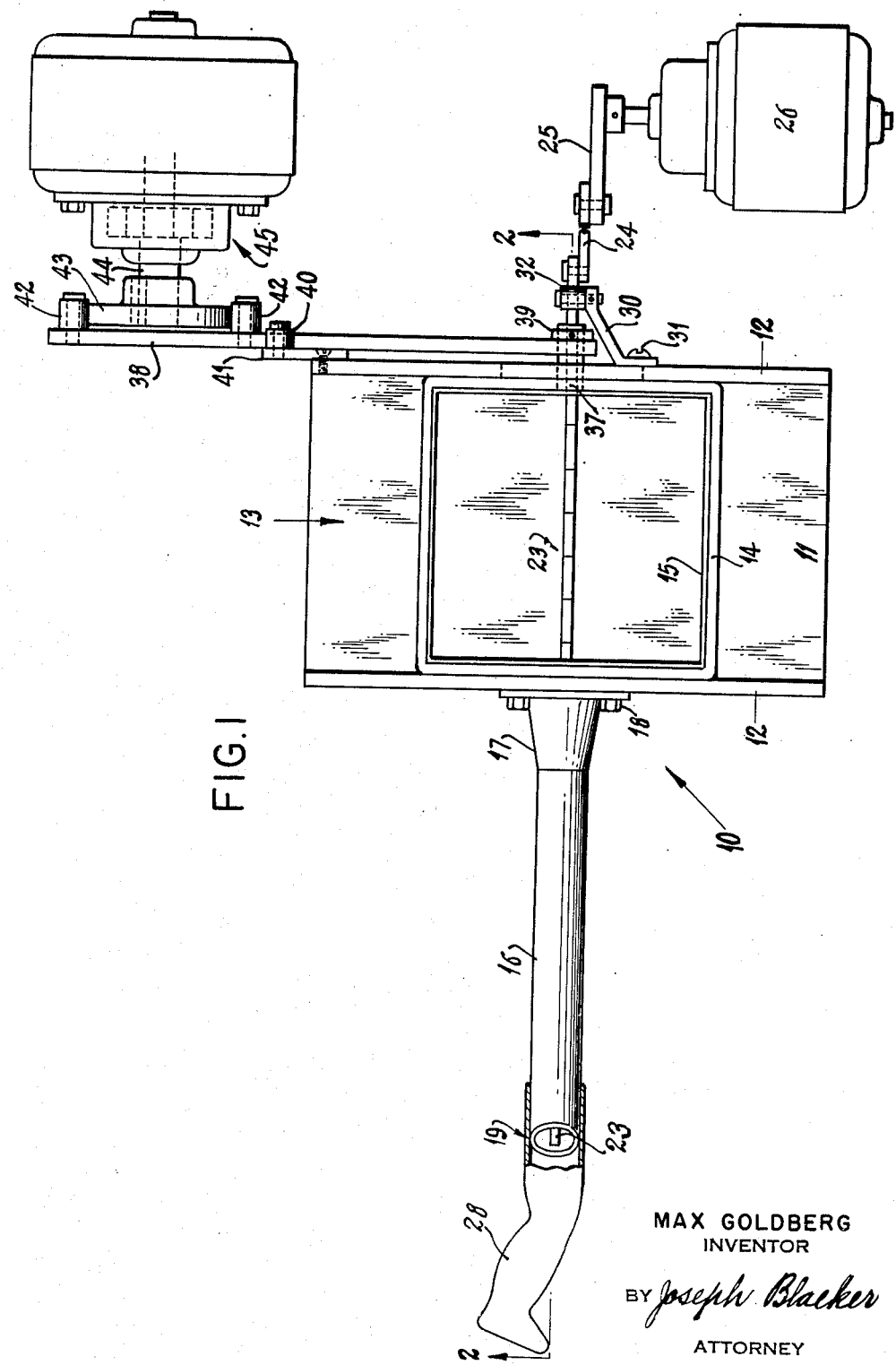

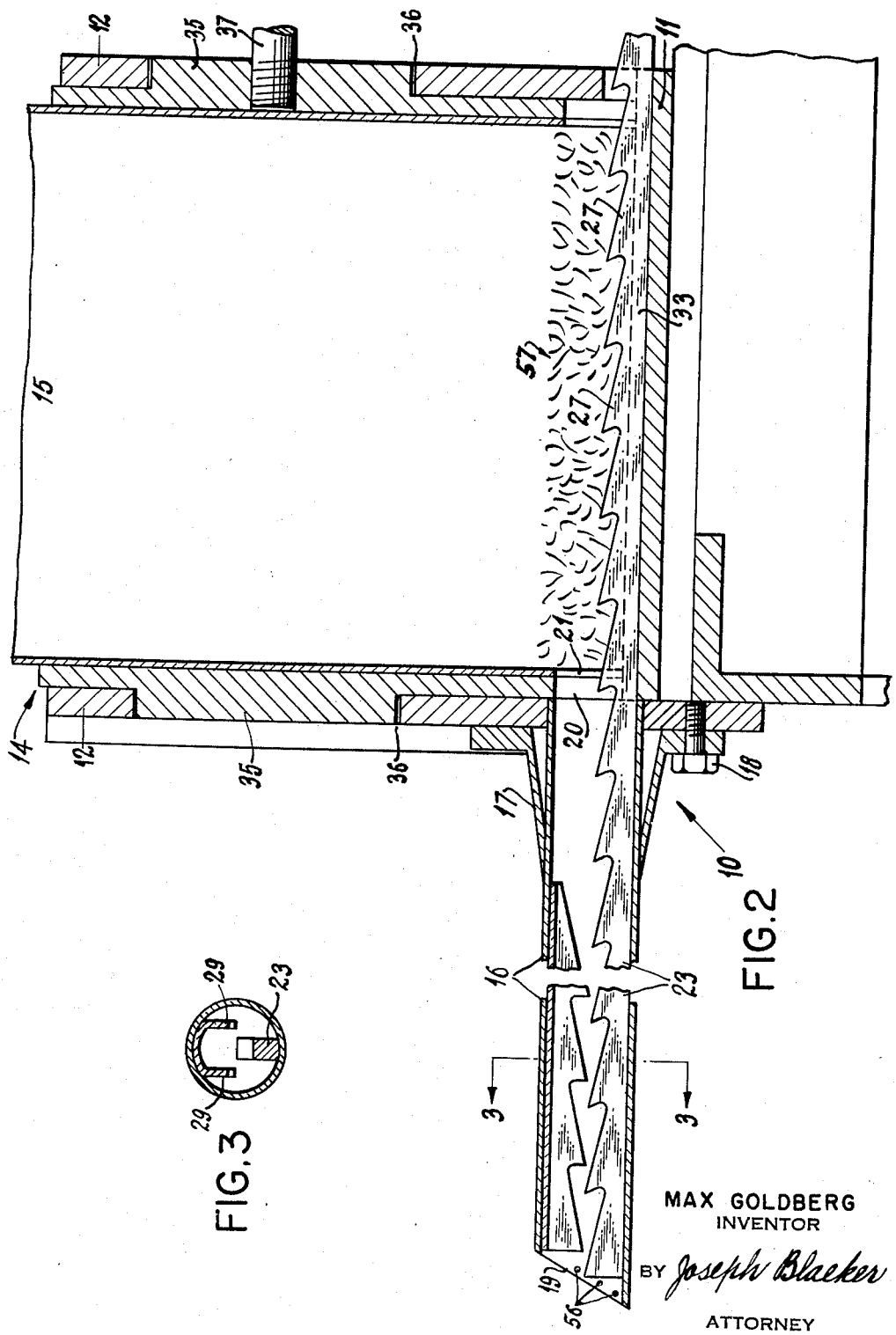

2,684,801

UNITED STATES PATENT OFFICE 2,684,801

FILLING MACHINE

Max Goldberg, New York, N. Y.

Application May 27, 1950, Serial No. 164,668

2 Claims. (Cl. 226—19)

This invention relates to a machine for filling the casings of articles, particularly those having non-porous casings, such as those used for making stuffed dolls or stuffed dolls' legs, etc., with fibrous material such as cotton, and like non-fluent filling materials.

In the art of filling small containers through a nozzle with cotton or similar non-fluent material which cling to the machine parts, it is found necessary to prevent the non-fluent material from backing up into the nozzle, and to provide means for continuously moving the material supply chute in relation to the nozzle so that material is removed from the chute, uniformly from successive sections thereof.

An object of this invention is to provide a filling machine for non-fluent fibrous filling materials and comprising a nozzle having a one-way toothed plunger or plungers for feeding materials therethrough and having reversely positioned teeth or fingers fixed therein for preventing backfeeding of the filling material.

Another object of this invention is to provide a base or platform on which a chute is slidably mounted while in upright position and a toothed plunger movable through the lower portion of the chute and through the nozzle, and to provide means for continuously moving the chute in right-angular relation with the plunger and to reciprocate the plunger simultaneously with the movements of the chute.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a plan view of the filling machine.

Figure 2 is a cross-sectional view taken on line 2—2 in Figure 1.

Figure 3 is a cross-sectional view taken on line 3—3 in Figure 2.

Figure 4 is a side elevation of the machine shown in Figures 1 to 3 inclusive.

Figure 5 is a side view of a fragmentary portion of a modified plunger.

In the illustrated embodiment of the invention, the numeral 10 indicates a filling machine comprising a platform 11 having two upright guide walls 12, 12, suitably fixed thereto in parallel relation to provide a guideway 13.

Slidably mounted on the platform 11 in contacting relation with the walls 12, 12 is a rectangular upright frame 14 having open top and bottom faces. An upright chute 15 having open top and bottom faces is mounted in fitting relation in the frame 14 and serves for supplying filling material in vertical stacked relation.

A nozzle 16 having an integral flanged fitting 17 is secured to one of the walls 12 by bolts 18. The free end 19 of the nozzle 16 is angularly directed so that the bottom wall projects further outwardly than the top wall. As best shown in Figures 3 and 4, it will be seen that the nozzle 16 is of circular cross-section.

The side wall 12 to which the nozzle 16 is secured has an elongated rectangular opening 20 and the chute 15 has a rectangular opening 21 in alignment with the opening 20. The openings 20 and 21 provide communication or passageway between the chute 15 and the nozzle 16.

As shown in Figures 2 and 3, there is provided an elongated plunger 23 extending through the nozzle 16 and through the chute 15 and connects by a link 24 to a crank 25 driven by an electric motor 26. The motor causes the plunger 23 to reciprocate through the chute and through the nozzle.

The plunger 23 has acute angular feeding teeth 27 arranged to impart a one-way feeding motion to the fibrous filling material in the hopper 15 into and through the nozzle 16 and into a small container such as a doll's leg 28 secured to the nozzle 16.

For the purpose of preventing the fibrous material from being pulled back into the chute on the return strokes of the plunger, I provide two linear sets of fixed angular retaining fingers 29, 29 secured lengthwise of the nozzle and in spaced-apart relation from each other. The two sets of fingers may be integrally connected as shown in Figure 3 to be of inverted U-shaped cross-section.

It is to be noted that the retaining fingers 29 are reversely positioned to the direction of the feeding teeth 27 of the plunger 23. The fingers retain the filling material against movement opposite to the direction of feed while permitting movement of the filling material only in an outward direction through the nozzle.

As shown in Figure 1, I provide a bracket 30 which is suitably secured to one of the walls 12 by screws 31. The bracket carries upper and lower roller bearings 32 between which a rectangular portion of the plunger bar 23 passes in frictional engagement and is supported thereby. Additional support is given to the plunger 23 by having its lower portion seated in an elongated groove 33 in the platform 11.

Two side walls of the frame 14 have extensions 35 slidably mounted in guideways 36. One of the extensions has a stud 37 threaded therein. A link 38 has one end mounted on the stud 37 and is suitably secured thereon by a pinned collar 39. The link 38 is slidably supported at its mid-portion between upper and lower rollers 40 carried by a plate 41 fixed to a guide wall 12.

The link 38 also carries rollers 42 providing a track between which a disk cam of heart shape 43 is rotatably mounted. The cam is mounted on a shaft 44 driven by reduction gear motor 45. The cam serves for the conversion of uniform rotary motion into uniform rectilinear reciprocating motion.

The link 38 reciprocates the frame 14 and the chute 15 in right-angular relation with the plunger 23 to cause the plunger to remove filling material from the lower portion of the chute, from successive sections thereof, and feed the material into the container 28 on the nozzle 16. In the preferred embodiment, the plunger 23 is reciprocated at a higher rate of speed than the chute 15.

In order to prevent backing up of the feeding material by the feeding teeth on the plunger on the return strokes of the plunger, I provide a modified plunger 48 shown in Figure 5. The modified plunger 48 has teeth 49 pivotally mounted on pins 50 and raised by leaf springs 51. Each tooth 49 has an integral extension 52 resting against a wall stop 53 when in feeding position. On the return strokes of the modified plunger 48 the pivotally mounted teeth fold down to the plunger body and cannot backfeed the filling material from the nozzle to the chute.

It is to be noted that the chute 15 has a window 55 vertically positioned in one of its side walls whereby the operator notes the remainder quantity of the filling material in the chute.

Needle-shaped pins 56 may be fixed in the nozzle 16, transversely thereof, near the outlet 19 to break up the packed filling material 57 and refluff the material being fed into the container 28.

It is to be noted that in practice, a number of chutes or hoppers 15 are provided with the machine and that while one of these is removably mounted in the frame 14, the other chutes are being filled or charged as cartridges and made ready for use in the filling machine.

In place of the pins for breaking up the filling material I may provide a jet of compressed air (not shown) blown into the outlet point of the nozzle to break up the filling material and prevent the formation of lumps.

It is to be noted that folding fingers may be used on the upper teeth to permit a greater quantity of filling material to be fed outwardly.

In accordance with the patent statutes I have described and illustrated the preferred embodiment of my invention, but it will be understood that various changes and modifications can be made therein without departing from the spirit of the invention as defined by the appended claims.

I claim:

1. In a machine for filling fabric containers of circular cross-section with fibrous materials, a platform having two parallel upright guide walls, an upright frame having open top and bottom faces, a chute for supplying filling material in vertically stacked relation and mounted in said frame, said frame and said chute being jointly movably mounted on said platform, a nozzle of circular cross-section fixed to one of said upright guide walls and communicating with said chute, said nozzle having an elongated movable bar with angular feeding teeth, said nozzle having two sets of angular retaining fingers secured lengthwise therein and in spaced-apart relation from each other, said fingers being reversely positioned to the direction of said feeding teeth to retain the filling material against movement opposite the direction of feed while permitting movement of said filling material only in an outward direction through said nozzle, said elongated bar and angular feeding teeth mounted for movement through said chute and below and intermediate said fingers, said fingers being immovable, said movable teeth and said immovable fingers lying within the boundary of said circular cross-section, means for reciprocating said plunger to feed said filling material through said nozzle, and means for reciprocating said frame and said chute to cause said toothed plunger to remove filling material from said chute, from successive sections thereof, said plunger being reciprocated at a higher rate of speed than said chute.

2. In a machine for filling small fabric containers with fibrous material, a platform having two parallel upright guide walls, an upright frame having open top and bottom faces, a chute for supplying filling material in vertically stacked relation and mounted in said frame, said frame and said chute being jointly movably mounted on said platform, a nozzle fixed to one of said upright guide walls and communicating with said chute, said nozzle having an elongated movable bar with angular feeding teeth, said nozzle having two sets of angular retaining fingers secured lengthwise therein and in spaced-apart relation from each other, said fingers being reversely positioned to the direction of said feeding teeth to retain the filling material against movement opposite the direction of feed while permitting movement of said filling material only in an outward direction through said nozzle, said elongated bar and angular feeding teeth being mounted for movement through said chute and below and intermediate said fingers, said fingers being immovable, said movable teeth and said immovable fingers lying within the boundary of said nozzle, means for reciprocating said plunger to feed said filling material through said nozzle, and means for reciprocating said frame and said chute to cause said toothed plunger to remove filling material from said chute, from successive sections thereof.

References Cited in the file of this patent

UNITED STATES PATENTS

| Number | Name | Date |
| --- | --- | --- |
| 108,262 | Hinkley | Oct. 11, 1870 |
| 196,933 | Reed | Nov. 6, 1877 |
| 683,157 | Trimble | Sept. 24, 1901 |
| 995,993 | Washburn et al. | June 20, 1911 |
| 1,370,798 | Riley | Nov. 30, 1920 |
| 2,476,723 | Goldberg | July 19, 1949 |